United States Patent
Catreux-Erceg et al.

(10) Patent No.: US 8,160,500 B2
(45) Date of Patent: *Apr. 17, 2012

(54) METHOD AND APPARATUS TO IMPROVE CLOSED LOOP TRANSMIT DIVERSITY MODES PERFORMANCE VIA INTERFERENCE SUPPRESSION IN A WCDMA NETWORK EQUIPPED WITH A RAKE RECEIVER

(75) Inventors: Severine Catreux-Erceg, Cardiff, CA (US); Vinko Erceg, Cardiff, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/109,187

(22) Filed: May 17, 2011

(65) Prior Publication Data

US 2011/0217936 A1 Sep. 8, 2011

Related U.S. Application Data

(63) Continuation of application No. 12/638,686, filed on Dec. 15, 2009, now Pat. No. 8,005,432, which is a continuation of application No. 11/442,860, filed on May 30, 2006, now Pat. No. 7,634,235.

(51) Int. Cl.
*H04B 17/00* (2006.01)
(52) U.S. Cl. .......... 455/67.11; 455/63.1; 455/67.13; 455/69; 455/562.1; 455/450; 455/522; 455/101; 370/335; 370/342; 370/208; 370/329; 375/267; 375/347; 375/148
(58) Field of Classification Search .......... 455/67.11, 455/63.1, 69, 67.13, 562.1, 450, 522, 101; 370/335, 208, 342, 329; 375/147–148, 267
See application file for complete search history.

(56) References Cited

U.S. PATENT DOCUMENTS

| | | | |
|---|---|---|---|
| 6,633,552 B1 | 10/2003 | Ling et al. | |
| 6,940,827 B2 | 9/2005 | Li et al. | |
| 7,116,723 B2 | 10/2006 | Kim et al. | |
| 7,339,980 B2 | 3/2008 | Grant et al. | |
| 7,366,253 B2 | 4/2008 | Kim et al. | |
| 7,634,235 B2 * | 12/2009 | Catreux-Erceg et al. | 455/67.11 |
| 7,680,064 B2 * | 3/2010 | Nabetani et al. | 370/252 |
| 7,839,835 B2 * | 11/2010 | Khojastepour et al. | 370/343 |
| 8,005,432 B2 * | 8/2011 | Catreux-Erceg et al. | 455/67.11 |
| 2005/0213682 A1 * | 9/2005 | Han et al. | 375/267 |
| 2006/0094373 A1 * | 5/2006 | Hottinen | 455/73 |
| 2007/0133707 A1 * | 6/2007 | Hwang et al. | 375/267 |
| 2008/0108310 A1 * | 5/2008 | Tong et al. | 455/69 |

FOREIGN PATENT DOCUMENTS

KR 20060059553 6/2006

* cited by examiner

*Primary Examiner* — Marceau Milord
(74) *Attorney, Agent, or Firm* — Sterne, Kessler, Goldstein & Fox PLLC

(57) ABSTRACT

A method for processing signals in a wireless communication system includes determining at a receiver, a maximum one of a plurality of signal-to-interference-plus-noise ratio (SINR) values for a received wireless signal. The plurality of SINR values may be calculated using a corresponding plurality of weight values. A particular one of the corresponding plurality of weight values may be fed back to a transmitter of the received wireless signal. The particular one of the corresponding plurality of weight values may be associated with the determined maximum one of the calculated plurality of SINR values. The particular one of the corresponding plurality of weight values may be communicated to the transmitter via at least one uplink communication channel. The at least one uplink communication channel may include a high-speed dedicated physical control channel (HS-DPCCH). Each of the plurality of SINR values may include at least one inter-path interference (IPI) value.

20 Claims, 8 Drawing Sheets

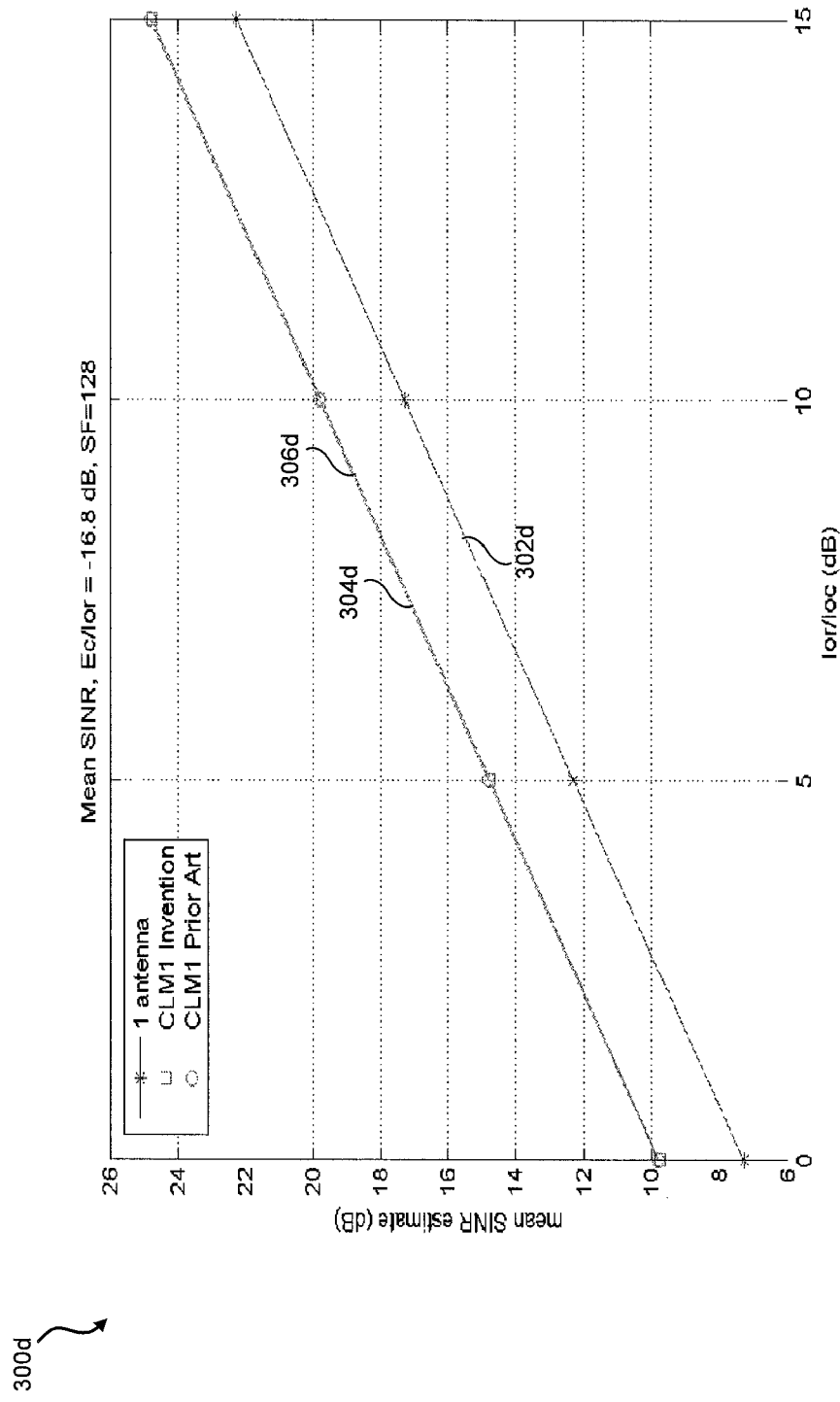

METHOD AND APPARATUS TO IMPROVE CLOSED LOOP TRANSMIT DIVERSITY MODES PERFORMANCE VIA INTERFERENCE SUPPRESSION IN A WCDMA NETWORK EQUIPPED WITH A RAKE RECEIVER

CROSS-REFERENCE TO RELATED APPLICATIONS/INCORPORATION BY REFERENCE

This application is a continuation of U.S. application Ser. No. 12/638,686 filed Dec. 15, 2009, which is a continuation of U.S. application Ser. No. 11/442,860 filed May 30, 2006 (now U.S. Pat. No. 7,634,235).

FIELD OF THE INVENTION

Certain embodiments of the invention relate to the processing of wireless communication signals. More specifically, certain embodiments of the invention relate to a method and apparatus to improve closed loop transmit diversity modes performance via interference suppression in a WCDMA network equipped with a RAKE receiver.

BACKGROUND OF THE INVENTION

Mobile communications has changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers. In this regard, networks based on wideband CDMA (WCDMA) technology may make the delivery of data to end users a more feasible option for today's wireless carriers.

The GPRS and EDGE technologies may be utilized for enhancing the data throughput of present second generation (2G) systems such as GSM. The GSM technology may support data rates of up to 14.4 kilobits per second (Kbps), while the GPRS technology, introduced in 2001, may support data rates of up to 115 Kbps by allowing up to 8 data time slots per time division multiple access (TDMA) frame. The GSM technology, by contrast, may allow one data time slot per TDMA frame. The EDGE technology, introduced in 2003, may support data rates of up to 384 Kbps. The EDGE technology may utilizes 8 phase shift keying (8-PSK) modulation for providing higher data rates than those that may be achieved by GPRS technology. The GPRS and EDGE technologies may be referred to as "2.5G" technologies.

The UMTS technology, introduced in 2003, with theoretical data rates as high as 2 Mbps, is an adaptation of the WCDMA 3G system by GSM. One reason for the high data rates that may be achieved by UMTS technology stems from the 5 MHz WCDMA channel bandwidths versus the 200 KHz GSM channel bandwidths. The HSDPA technology is an Internet protocol (IP) based service, oriented for data communications, which adapts WCDMA to support data transfer rates on the order of 10 megabits per second (Mbits/s). Developed by the 3G Partnership Project (3GPP) group, the HSDPA technology achieves higher data rates through a plurality of methods. For example, many transmission decisions may be made at the base station level, which is much closer to the user equipment as opposed to being made at a mobile switching center or office. These may include decisions about the scheduling of data to be transmitted, when data is to be retransmitted, and assessments about the quality of the transmission channel. The HSDPA technology may also utilize variable coding rates. The HSDPA technology may also support 16-level quadrature amplitude modulation (16-QAM) over a high-speed downlink shared channel (HS-DSCH), which permits a plurality of users to share an air interface channel In some instances, HSDPA may provide a two-fold improvement in network capacity as well as data speeds up to five times (over 10 Mbit/s) higher than those in even the most advanced 3G networks. HSDPA may also shorten the roundtrip time between network and terminal, while reducing variances in downlink transmission delay. These performance advances may translate directly into improved network performance and higher subscriber satisfaction. Since HSDPA is an extension of the GSM family, it also builds directly on the economies of scale offered by the world's most popular mobile technology. HSDPA may offer breakthrough advances in WCDMA network packet data capacity, enhanced spectral and radio access networks (RAN) hardware efficiencies, and streamlined network implementations. Those improvements may directly translate into lower cost-per-bit, faster and more available services, and a network that is positioned to compete more effectively in the data-centric markets of the future.

The capacity, quality and cost/performance advantages of HSDPA yield measurable benefits for network operators, and, in turn, their subscribers. For operators, this backwards-compatible upgrade to current WCDMA networks is a logical and cost-efficient next step in network evolution. When deployed, HSDPA may co-exist on the same carrier as the current WCDMA Release 99 services, allowing operators to introduce greater capacity and higher data speeds into existing WCDMA networks. Operators may leverage this solution to support a considerably higher number of high data rate users on a single radio carrier. HSDPA makes true mass-market mobile IP multimedia possible and will drive the consumption of data-heavy services while at the same time reducing the cost-per-bit of service delivery, thus boosting both revenue and bottom-line network profits. For data-hungry mobile subscribers, the performance advantages of HSDPA may translate into shorter service response times, less delay and faster perceived connections. Users may also download packet-data over HSDPA while conducting a simultaneous speech call.

HSDPA may provide a number of significant performance improvements when compared to previous or alternative technologies. For example, HSDPA extends the WCDMA bit rates up to 10 Mbps, achieving higher theoretical peak rates with higher-order modulation (16-QAM) and with adaptive coding and modulation schemes. The maximum QPSK bit rate is 5.3 Mbit/s and 10.7 Mbit/s with 16-QAM. Theoretical bit rates of up to 14.4 Mbit/s may be achieved with no channel coding. The terminal capability classes range from 900 kbit/s to 1.8 Mbit/s with QPSK modulation, and 3.6 Mbit/s and up with 16-QAM modulation. The highest capability class supports the maximum theoretical bit rate of 14.4 Mbit/s.

However, implementing advanced wireless technologies such as WCDMA and/or HSDPA may still require overcoming some architectural hurdles. For example, the RAKE receiver is the most commonly used receiver in CDMA systems, mainly due to its simplicity and reasonable performance and WCDMA Release 99 networks are designed so that RAKE receivers may be used. A RAKE receiver contains a bank of spreading sequence correlators, each receiving an individual multipath. A RAKE receiver operates on multiple discrete paths. The received multipath signals may be combined in several ways, from which maximum ratio combining (MRC) is preferred in a coherent receiver. However, a RAKE receiver may be suboptimal in many practical systems. For example, its performance may degrade from multiple access interference (MAI), that is, interference induced by other users in the network.

In the case of a WCDMA downlink, MAI may result from intercell and intracell interference. The signals from neighboring base stations compose intercell interference, which is characterized by scrambling codes, channels and angles of arrivals different from the desired base station signal. Spatial equalization may be utilized to suppress inter-cell interference. In a synchronous downlink application, employing orthogonal spreading codes, intracell interference may be caused by multipath propagation. In some instances, intracell interference may comprise inter-path interference (IPI). IPI may occur or RAKE fingers generated when one or more paths, or RAKE "fingers," interfere with other paths within the RAKE receiver. Due to the non-zero cross-correlation between spreading sequences with arbitrary time shifts, interference occurs between propagation paths (or RAKE fingers) after despreading, causing MAI. The level of intracell interference depends strongly on the channel response. In nearly flat fading channels, the physical channels remain almost completely orthogonal and intra-cell interference does not have any significant impact on the receiver performance. On the other hand, the performance of the RAKE receiver may be severely deteriorated by intra-cell interference in frequency selective channels. Frequency selectivity is common for the channels in WCDMA networks.

Due to the difficulties faced when non-linear channel equalizers are applied to the WCDMA downlink, detection of the desired physical channel with a non-linear equalizer may result in implementing an interference canceller or optimal multi-user receiver. Both types of receivers may be prohibitively complex for mobile terminals and may require information not readily available at the mobile terminal. Alternatively, the total base station signal may be considered as the desired signal. However, non-linear equalizers rely on prior knowledge of the constellation of the desired signal, and this information is not readily available at the WCDMA terminal. The constellation of the total base station signal, that is, sum of all physical channels, is a high order quadrature amplitude modulation (QAM) constellation with uneven spacing. The spacing of the constellation changes constantly due to transmission power control (TPC) and possible power offsets between the control data fields, time-multiplexed to the dedicated physical channels. The constellation order may also frequently change due to discontinuous transmission. This makes an accurate estimation of the constellation very difficult.

In this regard, the use of multiple transmit and/or receive antennas may result in an improved overall system performance. These multi-antenna configurations, also known as smart antenna techniques, may be utilized to mitigate the negative effects of multipath and/or signal interference on signal reception. It is anticipated that smart antenna techniques may be increasingly utilized both in connection with the deployment of base station infrastructure and mobile subscriber units in cellular systems to address the increasing capacity demands being placed on those systems. These demands arise, in part, from a shift underway from current voice-based services to next-generation wireless multimedia services that provide voice, video, and data communication.

The utilization of multiple transmit and/or receive antennas is designed to introduce a diversity gain and to suppress interference generated within the signal reception process. Such diversity gains improve system performance by increasing received signal-to-noise ratio, by providing more robustness against signal interference, and/or by permitting greater frequency reuse for higher capacity. In communication systems that incorporate multi-antenna receivers, a set of M receive antennas may be utilized to null the effect of (M−1) interferers, for example. Accordingly, N signals may be simultaneously transmitted in the same bandwidth using N transmit antennas, with the transmitted signal then being separated into N respective signals by way of a set of N antennas deployed at the receiver. Systems that utilize multiple transmit and receive antennas may be referred to as multiple-input multiple-output (MIMO) systems. One attractive aspect of multi-antenna systems, in particular MIMO systems, is the significant increase in system capacity that may be achieved by utilizing these transmission configurations. For a fixed overall transmitted power, the capacity offered by a MIMO configuration may scale with the increased signal-to-noise ratio (SNR). For example, in the case of fading multipath channels, a MIMO configuration may increase system capacity by nearly M additional bits/cycle for each 3-dB increase in SNR.

However, the widespread deployment of multi-antenna systems in wireless communications, particularly in wireless handset devices, has been limited by the increased cost that results from increased size, complexity, and power consumption. Providing a separate RF chain for each transmit and receive antenna is a direct factor that increases the cost of multi-antenna systems. As the number of transmit and receive antennas increases, the system complexity, power consumption, and overall cost may increase. In addition, conventional methods of signal processing at the receiver side of a wireless communication system do not take into account outside interference as well as IPI resulting within a multipath fading environment. This poses problems for mobile system designs and applications.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or apparatus to improve closed loop transmit diversity modes performance via interference suppression in a WCDMA network equipped with a RAKE receiver, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 3D is a fourth graph illustrating closed loop transmit diversity modes performance via interference suppression in a wireless system using a RAKE receiver, in accordance with an embodiment of the invention.

DETAILED DESCRIPTION OF THE INVENTION

Certain embodiments of the invention may be found in a method and/or apparatus to improve closed loop transmit diversity modes performance via interference suppression in a WCDMA network equipped with a RAKE receiver. Aspects of the method may include calculating at a receiver, a plurality of signal-to-interference-plus-noise ratio (SINR) values for a wireless signal, which is received from a transmitter, based on a corresponding plurality of weight values. A maximum one of the calculated plurality of SINR values may be determined. At least one weight value comprising one of the corresponding plurality of weight values may be fed back to the transmitter. The at least one weight value comprising one of the corresponding plurality of weight values may be associated with the determined maximum one of the calculated plurality of SINR values. The weight value comprising one of the corresponding plurality of weight values may be communicated to the transmitter via at least one uplink communication channel. Each of the plurality of SINR values may comprise an inter-path interference (IPI) value. Channel state information and/or system geometry information for the wireless signal may be acquired at the receiver. The plurality of SINR values for the wireless signal may be calculated at the receiver based on the channel state information and/or the system geometry information.

Figure 1A:
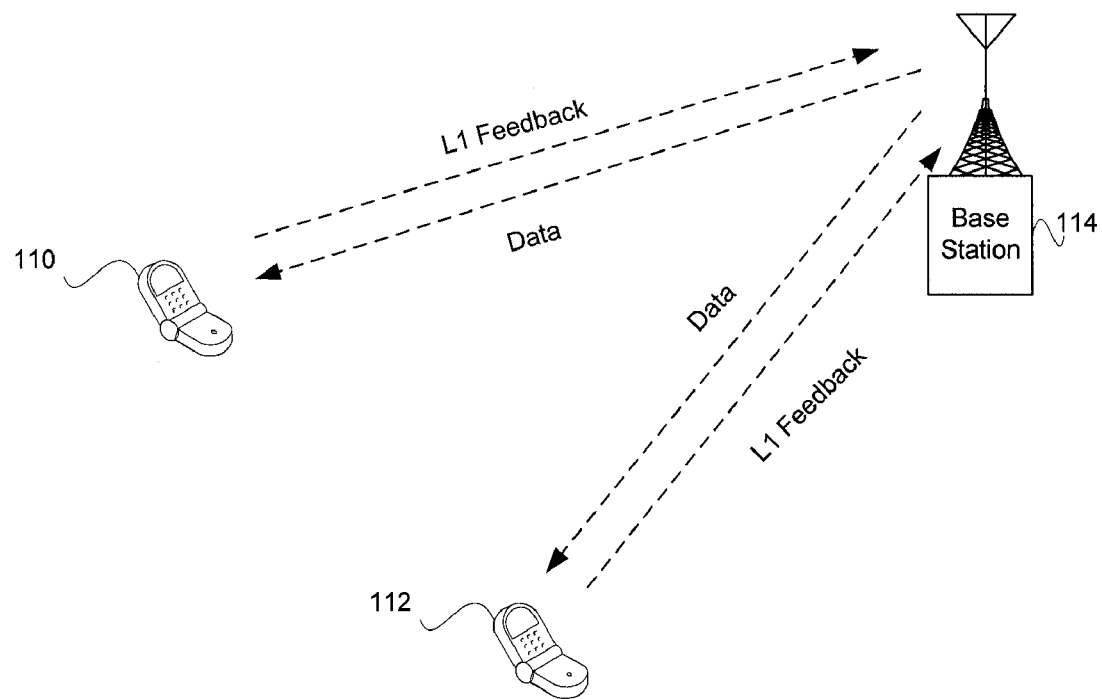
FIG. 1A illustrates an exemplary wireless distributed architecture that achieves low delay link adaptation, in connection with an embodiment of the invention.

FIG. 1A illustrates an exemplary wireless distributed architecture that achieves low delay link adaptation, in connection with an embodiment of the invention. Referring to FIG. 1A, there is shown user equipment (UE) 110 and 112 and a base station (BS) 114. A WCDMA data connection, such as HSDPA may be built on a distributed architecture that achieves low delay link adaptation by placing key processing at the BS 114 and thus closer to the air interface as illustrated. Accordingly, the MAC layer at the BS 114 is moved from Layer 2 to Layer 1, which implies that the systems may respond in a much faster manner with data access. Fast link adaptation methods, which are generally well established within existing GSM/EDGE standards, include fast physical layer (L1) retransmission combining and link adaptation techniques. These techniques may deliver significantly improved packet data throughput performance between the mobile terminals 110 and 112 and the BS 114.

The HSDPA technology employs several important new technological advances. Some of these may comprise scheduling for the downlink packet data operation at the BS 114, higher order modulation, adaptive modulation and coding, hybrid automatic repeat request (HARQ), physical layer feedback of the instantaneous channel condition, and a new transport channel type known as high-speed downlink shared channel (HS-DSCH) that allows several users to share the air interface channel. When deployed, HSDPA may co-exist on the same carrier as the current WCDMA and UMTS services, allowing operators to introduce greater capacity and higher data speeds into existing WCDMA networks. HSDPA replaces the basic features of WCDMA, such as variable spreading factor and fast power control, with adaptive modulation and coding, extensive multicode operation, and fast and spectrally efficient retransmission strategies.

In current-generation WCDMA networks, power control dynamics are on the order of 20 dB in the downlink and 70 dB in the uplink. WCDMA downlink power control dynamics are limited by potential interference between users on parallel code channels and by the nature of WCDMA base station implementations. For WCDMA users close to the base station, power control may not reduce power optimally, and reducing power beyond the 20 dB may therefore have only a marginal impact on capacity. HSDPA, for example, utilizes advanced link adaptation and adaptive modulation and coding (AMC) to ensure all users enjoy the highest possible data rate. AMC therefore adapts the modulation scheme and coding to the quality of the appropriate radio link.

Furthermore, WCDMA networks, including HSDPA networks may utilize closed-loop transmit diversity mode (CLTDM) to improve the performance of a wireless system. For example, the BS 114 may be equipped with one or more transmit antennas, each of which may transmit one or more weighted versions of the same signal. The UE 110 and 112 may comprise a RAKE receiver which may process the received wireless signal. The weights used by the BS 114 may be determined by the user equipment (UE) 110 and/or 112, and may be communicated to the BS 114 via a feedback control message. In a WCDMA system that uses a combination of CLTDM at the transmitter and RAKE at the receiver, the complex value of the weights may be computed within the UE 110 and/or 112 so as to optimize received signal processing performance at the output of the RAKE receivers.

In closed-loop mode 1 (CLM1) and closed-loop mode 2 (CLM2) transmit diversity scenarios two weights (w1 and w2) may be communicated from the UE 110 and/or 112 to the transmitter in the BS 114. In a CLM1 scenario, the weight value w1 may be a constant, such as 1, and the weight value w2 may be determined within the RAKE receiver of the UE 110 and/or 112. The weight value w2 may then be communicated to the transmitter in the BS 114. In a CLM2 scenario, both weight values w1 and w2 may be determined within the RAKE receiver of the UE 110 and/or 112. The weight values w1 and w2 may then be communicated to the transmitter in the BS 114.

In some instances, the weight values w1 and/or w2 may be computed so that the received power of the UE 110 and/or 112 is maximized. An example of such weight computation may be read in the "3G Partnership Project" (3GPP) specification, TS 25.214, entitled "Physical Layer Procedures (FDD)," which is hereby incorporated by reference herein in its entirety.

In one embodiment of the invention, the UE 110 and/or 112 may calculate the weight values w1 and/or w2 so that SINR at the output of the RAKE receiver is maximized. In this regard, the SINR may take into account inter-path-interference (IPI) that is internal to the communication path between the UE 110 and/or 112 and the BS 114. By maximizing SINR during the weight value generation process in a multipath fading environment, RAKE receiver performance and CLTDM performance may be further improved.

Figure 1B:
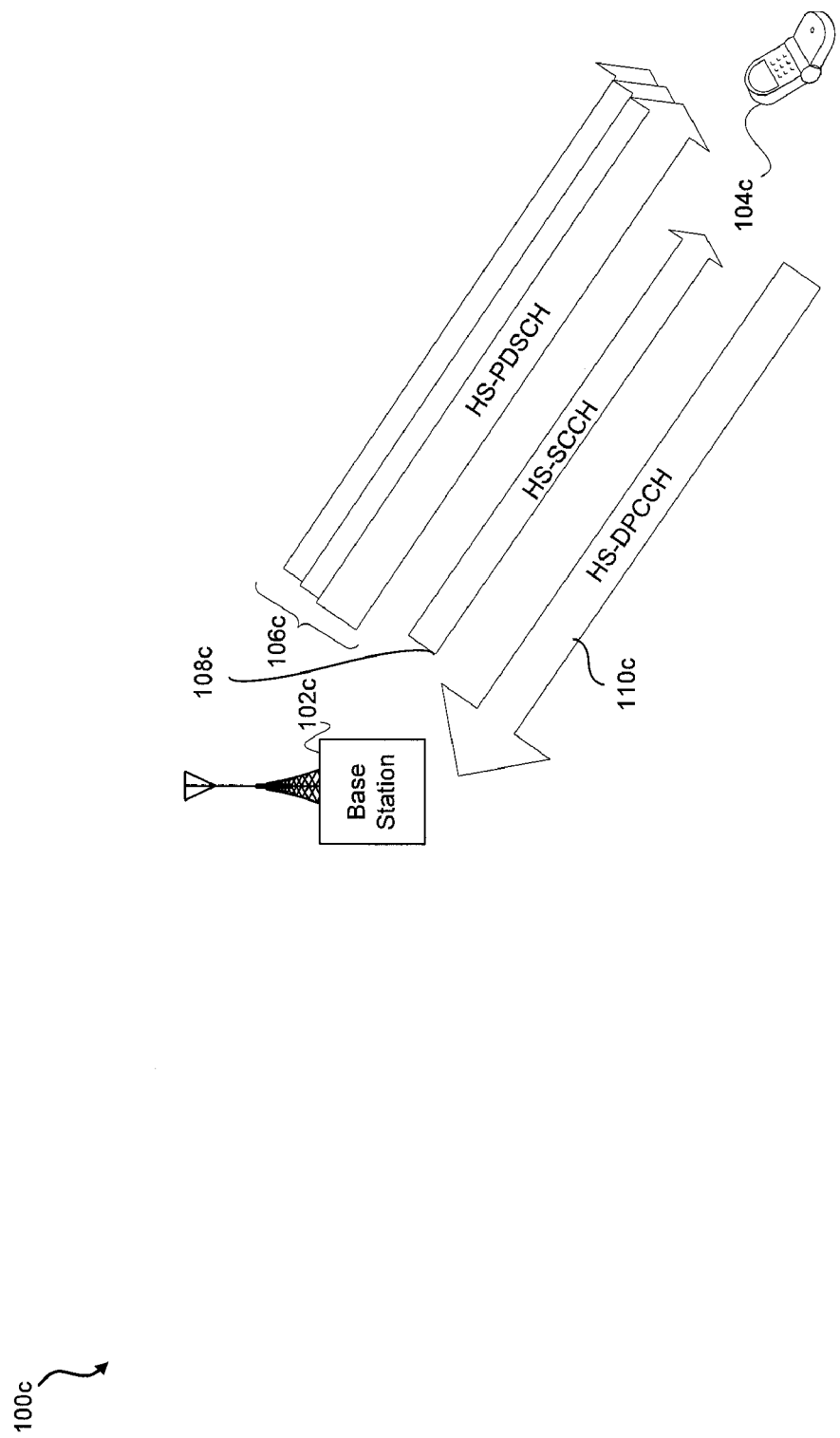
FIG. 1B is a diagram illustrating an exemplary HSDPA channel structure, which may be utilized in connection with an embodiment of the invention.

FIG. 1B is a diagram illustrating an exemplary HSDPA channel structure, which may be utilized in connection with an embodiment of the invention. Referring to FIG. 1B, three additional channels may be used to support HSDPA connection between the base station 102c and the UE 104c. A high-speed downlink shared channel (HS-DSCH) 106c and a high speed shared control channel (HS-SCCH) 108c may be used on the downlink between the base station 102c and the UE 104c. A high-speed dedicated physical control channel (HS-DPCCH) 110c may be used on the uplink between the UE 104c and the base station 102c.

The HS-DPCCH 110c may be used as a signaling channel that carries acknowledge (ACK) and non-acknowledge (NACK) signals and measurement reports. The HS-DSCH 106c may comprise a plurality of high-speed physical downlink shared channel (HS-PDSCH) and may be used to carry user data. The HS-SCCH 108c may be used to carry exemplary control information, such as modulation, HARQ redundancy/constellation version, HARQ processor ID, new data indication, index of the transport block size, and/or user equipment (UE) identity information corresponding to the data carried in the HS-DSCH channel 106c. The UE 104c may use several physical channel-related parameters to indicate to the base station 102c its capability to support the HSDPA services.

In one embodiment of the invention, the wireless system 100c may utilize CLTDM to improve signal processing at the UE 104c. In this regard, one or more weight values may be calculated at the UE 104c and may be communicated to the base station 102c via the HS-DPCCH 110c. The UE 104c may determine the one or more weights by, for example, maximizing signal-to-interference-plus-noise ratio (SINR) at the output of RAKE receiver within the UE 104c.

Figure 2:
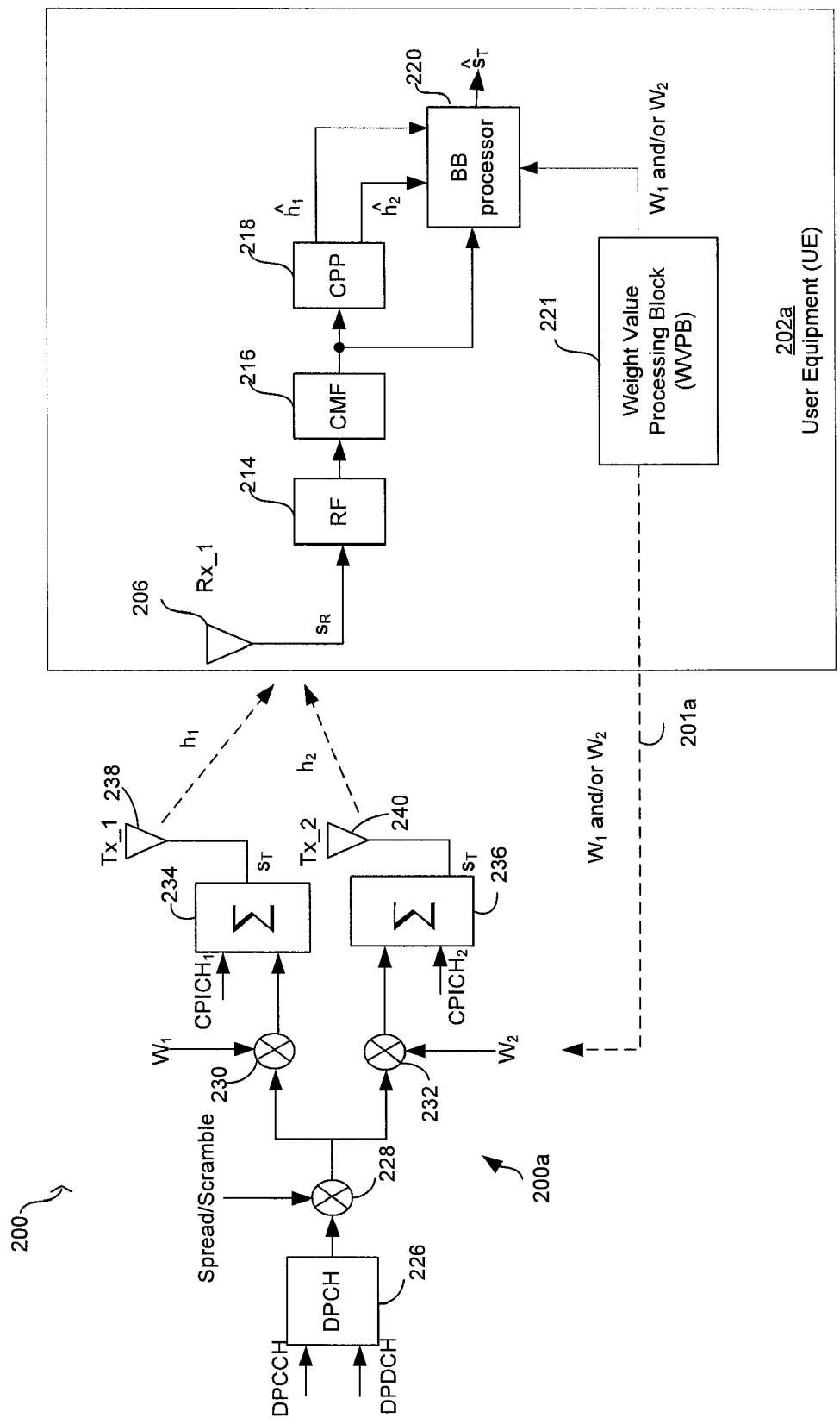
FIG. 2 is a block diagram of an exemplary wireless communication system with receiver channel estimation, in accordance with an embodiment of the invention.

FIG. 2 is a block diagram of an exemplary wireless communication system with receiver channel estimation, in accordance with an embodiment of the invention. Referring to FIG. 2, the wireless communication system 200 may comprise a dedicated physical channel (DPCH) block 226, a plurality of mixers 228, 230 and 232, a first combiner 234, a second combiner 236, a first transmit antenna (Tx_1) 238, an additional transmit antenna (Tx_2) 240, and a first receive antenna (Rx_1) 206. The wireless communication system 200 may further comprise an RF block 214, a chip matching filter (CMF) 216, a cluster path processor (CPP) 218, a baseband (BB) processor 220, and a weight value processing block (WVPB) 221. Furthermore, the receive antenna 206, the RF block 214, the CMF 216, the CPP 218, the BB processor 220, and the WVPB 221 may be located within user equipment (UE) 202a. The UE 202a may be, for example, a wireless phone or another wireless device such as a Smart-Phone or PDA with cell phone capabilities.

The DPCH 226 may comprise suitable logic, circuitry, and/or code that may be adapted to receive a plurality of input channels, for example, a dedicated physical control channel (DPCCH) and a dedicated physical data channel (DPDCH). The DPCH 226 may be adapted to simultaneously control the power on each of the DPCCH and DPDCH channels. The mixer 228 may comprise suitable logic and/or circuitry that may be adapted to multiply the output of DPCH 226 with a spread and/or scramble signal to generate a spread complex-valued signal that may be transferred to the inputs of the mixers 230 and 232.

The mixers 230 and 232 may comprise suitable logic and/or circuitry that may be adapted to multiply the spread complex-valued signal from the mixer 228 by the closed loop 1 (CL1) and closed loop 2 (CL2) transmit diversity weight factors $W_1$ and $W_2$ respectively. Closed loop transmit diversity modes (CLTDM) are described in the $3^{rd}$ Generation Project Partnership (3GPP), Technical Specification Group Radio Access Network, Physical Layer Procedures (FDD), Release 6 (3GPP TS 25.214 V5.5.0, 2003-06), which document is incorporated herein by reference in its entirety. For example, the weight factors $W_1$ and $W_2$ may correspond to phase and/or amplitude component feedback adjustments that may be generated by the receiver based on the type of space-time coding that is used. This approach may correspond to, for example, closed loop transmit diversity as currently being used in WCDMA. In this regard, a closed loop processing block may be utilized to transfer the weight factors or parameters that correspond to those weight factors to the transmitter via an uplink feedback process utilizing the feedback communication link 201a, for example.

The output of the mixer 230 may be transferred to the first combiner 234 and the output of the mixer 232 may be transferred to the second combiner 236. The first and second combiners 234 and 236 may comprise suitable logic, circuitry, and/or code that may be adapted to add or combine the outputs generated by mixers 230 and 232 with a common pilot channel 1 (CPICH1) signal and a common pilot channel 2 (CPICH2) signal respectively. The CPICH1 signal and CPICH2 signals may comprise fixed channelization code allocation and may be utilized to measure the signal phase and amplitude and strength of the propagation channels between the transmit antennas and the receive antennas.

The first transmit antenna, Tx_1 238, and the additional or second transmit antenna, Tx_2 240, may comprise suitable hardware that may be adapted to transmit a plurality of SC communication signals, $s_T$, from a wireless transmitter device. The first receive antenna, Rx_1 206 may comprise suitable hardware that may be adapted to receive at least a portion of the transmitted SC communication signals in a wireless receiver device as $s_R$. The propagation channels that corresponds to the paths taken by the SC communication signals transmitted from the transmit antennas Tx_1 238 and Tx_2 240 and received by the receive antenna Rx_1 206 may be represented by $h_1$ and $h_2$ respectively. In this regard, $h_1$ and $h_2$ may represent the actual time varying impulse responses of the radio frequency (RF) paths taken by the SC communication signals transmitted from the transmit antennas Tx_1 238 and Tx_2 240 and received by the receive antenna Rx_1 206.

In some instances, a wireless transmitter device comprising dual transmit antennas may be adapted to periodically transmit calibration and/or pilot signals that may be utilized by a 1-Rx antenna wireless receiver device to determine estimates of $h_1$ and $h_2$. The 2-Tx and 1-Rx antennas wireless communication system 200 in FIG. 2 may represent a Multiple Input Single Output (MISO) communication system whereby the diversity gain may be increased for the transmitted data.

The RF block 214 may comprise suitable logic and/or circuitry that may be adapted to process the combined received SC communication signal, $s_R$. The RF block 214 may perform, for example, filtering, amplification, and/or analog-to-digital (A/D) conversion operations. The CMF 216 may comprise suitable logic, circuitry, and/or code that may be adapted to operate as a matched-filter on the digital output from the RF block 214. The output of the CMF 216 may be transferred, for example, to the CPP 218 and/or to the BB processor 220 for further processing. The CPP 218 may comprise suitable logic, circuitry, and/or code that may be adapted to process the filtered output of the CMF 216 to determine a first baseband combined channel estimate, $\hat{h}_1$, which may comprise information regarding propagation channels $h_1$. The CPP 218 may also be adapted to process the filtered output of the CMF 216 to determine a second baseband combined channel estimate, $\hat{h}_2$, which may comprise information regarding propagation channels $h_2$. In this regard, the CPP 218 may process the received signals in clusters. The CPP 218 may also be adapted to generate a lock indicator signal that may be utilized by, for example, the BB processor 220 as an indication of whether the channel estimates are valid. The BB processor 220 may comprise suitable logic, circuitry, and/or code that may be adapted to digitally process the filtered output of the CMF 216 to determine an estimate of the transmitted SC communication signals, $\hat{s}_T$.

The WVPB 221 may comprise suitable logic, circuitry, and/or code that may be adapted to receive the first and second baseband combined channel estimates, $\hat{h}_1$ and $\hat{h}_2$, from the BB processor 220 or from the CPP 218 and generate the weight values w1 and w2, which may be communicated to the transmitter 200a via the dedicated physical control channel (DPCCH) 201a. Additionally, the WVPB 221 may comprise suitable logic, circuitry, and/or code that may be adapted to communicate the weights values w1 and w2 to the BB processor 220 which may use them to determine an estimate of the transmitted SC communication signals, $\hat{s}_T$.

In operation, the wireless communication system 200 may utilize closed loop mode 1 (CLM1) or closed loop mode 2 (CLM2) transmit diversity. In this regard, the WVPB 221 may generate one or more weight values, for example w1 and w2, which may be fed back to the transmit side 200a via the feedback communication path 201a. For example, if CLM1 is utilized, the weight factor w1 may comprise a constant scalar, such as 1, and the weight factor w2 may comprise a complex value, such as a corresponding phase adjustment $\phi$. If the wireless communication system 200 utilizes CLM2, both w1 and w2 may assume different values.

In some instances, the wireless communication system 200 may utilize CLM1. The WVPB 221 within the UE 202a may compute the phase adjustment, $w_2 = e^{j\phi}$ once for every slot so that receive power at the UE 202a is maximized. An example of such weight computation may be read in the "3G Partnership Project" (3GPP) specification, TS 25.214, entitled "Physical Layer Procedures (FDD)," which is hereby incorporated by reference in its entirety In instances when a non-soft handover occurs within the wireless communication system 200, the computation of feedback information by the WVPB 221 may be accomplished by, for example, solving for a weight vector, $\underline{w}$, that maximizes:

$$P = \underline{w}^H H^H H \underline{w}$$

where $$H = [\underline{h}_1 \underline{h}_2] \text{ and } \underline{w} = [w_1, w_2]^T$$

and where the column vectors $\underline{h}_1$ and $\underline{h}_2$ represent the estimated channel impulse responses for the transmission antennas 1 and 2, of length equal to the length of the channel impulse response. The estimated channel impulse responses may be received by the WVPB 221 from the CPP 218.

In another embodiment of the invention, the WVPB 221 within the UE 202a may compute one or more of the weight factors w1 and w2 to maximize the received SINR at the output of the RAKE receiver within the UE 202a. In this regard, the SINR may take into account the inter-path-interference (IPI) that is internal to the communication path between the UE 202a and the transmit side 200a. By maximizing SINR during the weight value generation process in a multipath fading environment, RAKE receiver performance and CLTDM performance may be further improved.

In instances where CLM1 is utilized by the wireless communication system 200, the weight value w1 may equal a constant, such as 1. The received signal at finger i of the RAKE receiver within the UE 202a may be represented by the equation:

$$r_i = \sqrt{\frac{P_s}{2}} x(h_{1i} + w_2 h_{2i}) + n_i, \quad (1.)$$

where $P_s$ may comprise the transmit signal power and x may comprise a transmitted complex symbol. For example, the transmitted complex symbol may be quadrature amplitude modulation (QAM)-modulated and may be represented as (1+j). The factor of ½ may be used to account for the total transmit power split between the 2 transmit antennas 238 and 240. The variables $h_{1i}$, and $h_{2i}$, may comprise the channel gains at finger i for transmit antennas 238 and 240 respectively, and $n_i$ may comprise a complex random variable Gaussian distributed, with zero mean and variance $\sigma_i^2$. The variance $\sigma_i^2$ may comprise a measure of the additive noise and IPI, for example.

If IPI is present within the wireless communication system 200, the variance $\sigma_i^2$ may be represented by the equation:

$$\sigma_i^2 = I_{oc} + \frac{I_{or}}{2} \sum_{j \neq i} |h_{1j} + w_2 h_{2j}|^2, \quad (2.)$$

where $I_{oc}$ may comprise the power spectral density of a band limited white noise source, which may simulate outside interference from neighboring base stations, as measured at the receive antenna 206 of the UE 202a. $I_{or}$ may comprise the total transmit power spectral density of a downlink signal received at the UE 202a. The factor ½ may be used to take into account that the total transmit power may be divided equally among the 2 transmit antennas 238 and 240.

Consequently, $P_s$ may be represented by the equation:

$$P_s = \frac{E_c}{I_{or}} \cdot I_{or} \cdot SF, \quad (3.)$$

where $$\frac{E_c}{I_{or}}$$

may comprise the power allocation of the signal and SF may comprise a spreading factor. According to equation (1), the equivalent channel gain as seen at finger i at the receive antenna 206 of UE 202a may be represented as $h_{1i}+w_2h_{2i}$. The RAKE receiver of UE 202a may multiply the signal received at each finger by the conjugate of its corresponding equivalent channel, which may be represented by the following equation:

$$y_i = (h_{1i} + w_2 h_{2i})^* \quad (4.)$$

$$r_i = \sqrt{\frac{P_s}{2}} x |h_{1i} + w_2 h_{2i}|^2 + (h_{1i} + w_2 h_{2i})^* n_i$$

Post-multiplication, the RAKE receiver of the UE 202a may sum, or combine, the signals from all fingers together yielding the signal at the output of the RAKE receiver. The generated signal at the output of the RAKE receiver may be represented by the equation:

$$y = \sum_i \quad (5.)$$

$$y_i = \sqrt{\frac{P_s}{2}} x \sum_i |h_{1i} + w_2 h_{2i}|^2 + \sum_i n_i (h_{1i} + w_2 h_{2i})^*$$

Therefore, the SINR of the output signal communicated from the transmit side 200a and received by the UE 202a may be represented by the equation:

$$SINR_y = \frac{P_s \left( \sum_i |h_{1i} + w_2 h_{2i}|^2 \right)^2}{\sum_i \sigma_i^2 |h_{1i} + w_2 h_{2i}|^2} \quad (6.)$$

By replacing $\sigma_i^2$ by its expression in equation (2), and $P_s$ by its expression in equation (3), SINR may be expressed by the following resulting equation:

$$SINR_y = \frac{\frac{E_c}{I_{or}} \cdot I_{or} \cdot SF \left( \sum_i |h_{1i} + w_2 h_{2i}|^2 \right)^2}{\sum_i \left( I_{oc} + \frac{I_{or}}{2} \sum_{j \neq i} |h_{1j} + w_2 h_{2j}|^2 \right) |h_{1i} + w_2 h_{2i}|^2} \quad (7.)$$

The numerator and denominator in equation (7) may be normalized by $I_{oc}$, resulting in the following equation for SINR:

$$SINR_y = \frac{\frac{E_c}{I_{or}} \cdot \frac{I_{or}}{I_{oc}} \cdot SF \left( \sum_i |h_{1i} + w_2 h_{2i}|^2 \right)^2}{\sum_i \left( 1 + \frac{1}{2} \frac{I_{or}}{I_{oc}} \sum_{j \neq i} |h_{1j} + w_2 h_{2j}|^2 \right) |h_{1i} + w_2 h_{2i}|^2}, \quad (8.)$$

where $I_{or}/I_{oc}$ may be referred to as the geometry of the system, or system geometry. In instances when the system geometry and channel impulse responses for the transmit antennas 238 and 240 are known, the value of the weight factor $w_2$ may be computed so that the SINR may be maximized.

In one embodiment of the invention, a search over a plurality of possible values of $w_2$ may be utilized, and a weight value that maximizes the SINR may be selected to be communicated to the transmit side 200a via the feedback communication link 201a.

In instances when the wireless communication system 200 utilizes CLM1, $w_2$ may comprise a phase shift and may be represented by the equation $w_2 = e^{j\phi}$. In this regard, a search may be performed by the WVPB 221 for values of $\phi$ so that a maximum value of SINR is obtained. In instances when the channel impulse responses may change from slot to slot, the weight value $w_2$ may be re-calculated at each slot. The search for $\phi$ may be carried out over the range $[0, 360]°$, for example, in quantized steps of X°, where X may be equal to, for example, 1, 5, 10, or 45. For example, if X=45, there may be 8 possible values for $\phi$. The SINR may then be computed for each of the 8 values, utilizing equation (8). A value of $\phi$ that maximizes the SINR may then be selected.

In another embodiment of the invention, the wireless communication system 200 may utilize CLM2. In such instances, SINR may be represented by the following equation:

$$SINR_y = \frac{\frac{E_c}{I_{or}} \cdot \frac{I_{or}}{I_{oc}} \cdot SF \left( \sum_i |w_1 h_{1i} + w_2 h_{2i}|^2 \right)^2}{\sum_i \left( 1 + \frac{1}{2} \frac{I_{or}}{I_{oc}} \sum_{j \neq i} |w_1 h_{1j} + w_2 h_{2j}|^2 \right) |w_1 h_{1i} + w_2 h_{2i}|^2} \quad (9.)$$

In instances when CLM2 is utilized, the WVPB 221 within the UE 202a may perform a search over both weight values $w_1 = A_1$ and $w_2 = A_2 e^{j\phi}$. In this regard, the search may be performed over three parameters, $A_1$, $A_2$, $\phi$. The search may be quantized to reduce the number of possible combinations of these three parameters.

Referring again to FIG. 2, in instances when the wireless communication system 200 utilizes CLM1 and $w_1 = 1$, it may be assumed that channel impulse responses from both transmit antennas 238 and 240 have the same length. In such instances, each tap, or channel delay, may be represented by a Rayleigh faded variable. Taps may have different relative powers and the sum of all taps may be normalized to unity. Furthermore, for purposes of illustrating closed loop transmit diversity modes performance, a power allocation (Ec/Ior) of −16.8 dB and a spreading factor of 128 may be assumed.

FIGS. 3A-3D are graphs illustrating closed loop transmit diversity modes performance via interference suppression in a wireless system using a RAKE receiver, in accordance with an embodiment of the invention. Each of FIG. 3x, where x=[a; b; c; d], illustrate graphs 302x, 304x, and 306x, which represent the mean SINR at the output of a RAKE receiver, such as a RAKE receiver within the UE 202a of FIG. 2, as a function of the system geometry Ior/Ioc. Graph 302x represents the performance of a system with no diversity where only one transmit antenna is used. Graph 304x represents the performance of a system with CLM1 diversity where the weight solution is calculated to maximize the SINR, in accordance with aspects of the present invention.

Graph 306x represents the performance of a system with CLM1 diversity where the weight solution is calculated according to a different criterion, such as to maximize the received power at the UE 202a. Furthermore, no quantization was applied on the weight solution generated by the system corresponding to graph 306a, and a quantization step of X=45 may be applied on the weight solution generated by the system corresponding to graph 304a. In this regard, a search over 8 possible values for φ may be utilized to generate the weight solution for the system corresponding to graph 306a.

Figure 3A:
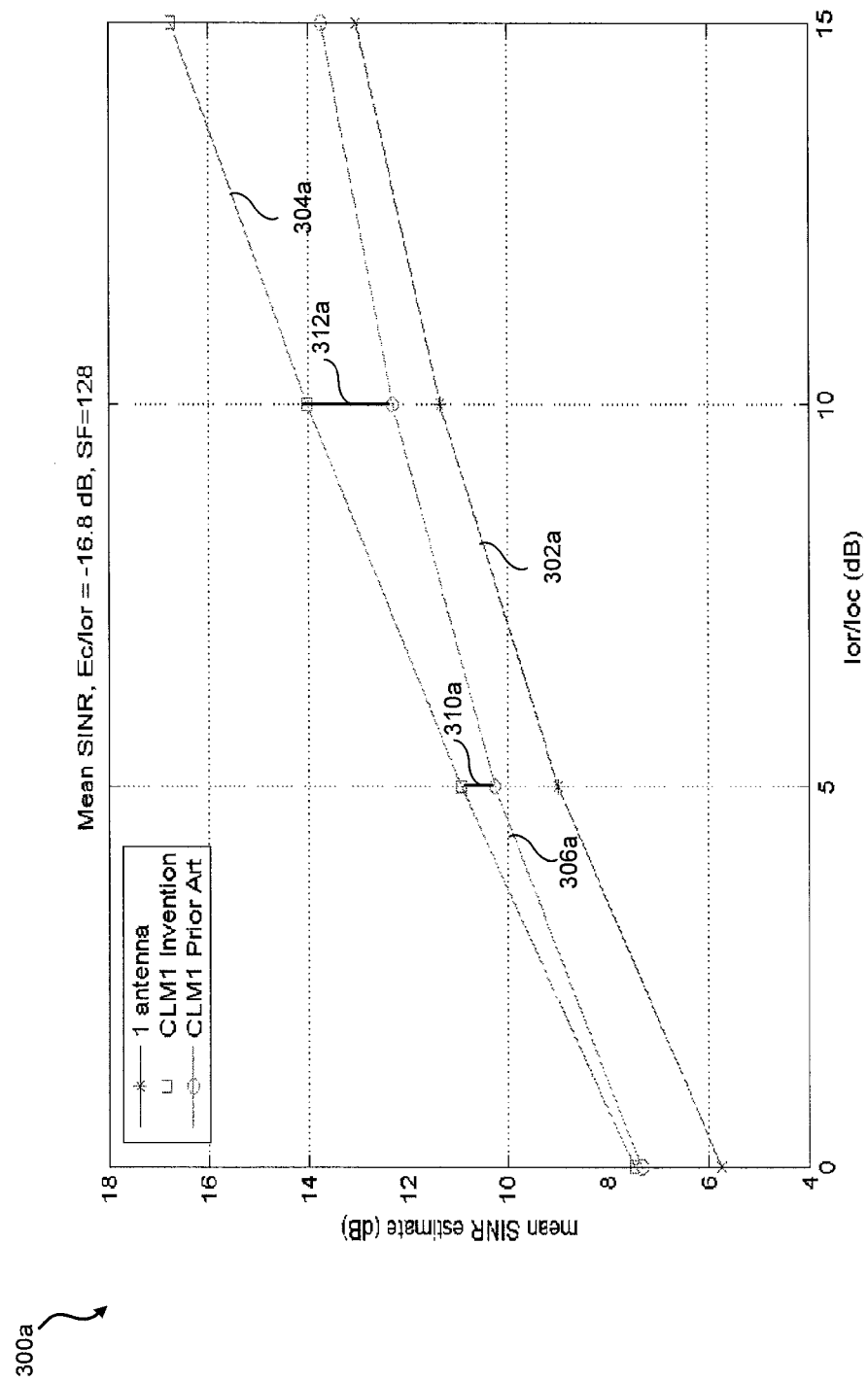
FIG. 3A is a first graph illustrating closed loop transmit diversity modes performance via interference suppression in a wireless system using a RAKE receiver, in accordance with an embodiment of the invention.

Referring to FIG. 3A, graphs 302a, 304a, and 306a illustrate closed loop transmit diversity modes performance when the channel response comprises 2 equal power taps. As illustrated in FIG. 3A, the gain of CLM1 with prior art technique, graph 306a, over the 1-antenna system, graph 302a, diminishes with increasing system geometry. However, the gain of CLM1 using the maximized SINR criterion as illustrated in graph 304a, increases over CLM1 using the prior art technique of maximizing the receive power, as illustrated by increasing gaps 310a and 312a. The gain values 310a and 312a of CLM1 using the maximized SINR criterion over prior art under these channel conditions may be estimated as 0.65 dB and 1.75 dB, respectively, at system geometry values 5 and 10 dB, respectively.

Figure 3B:
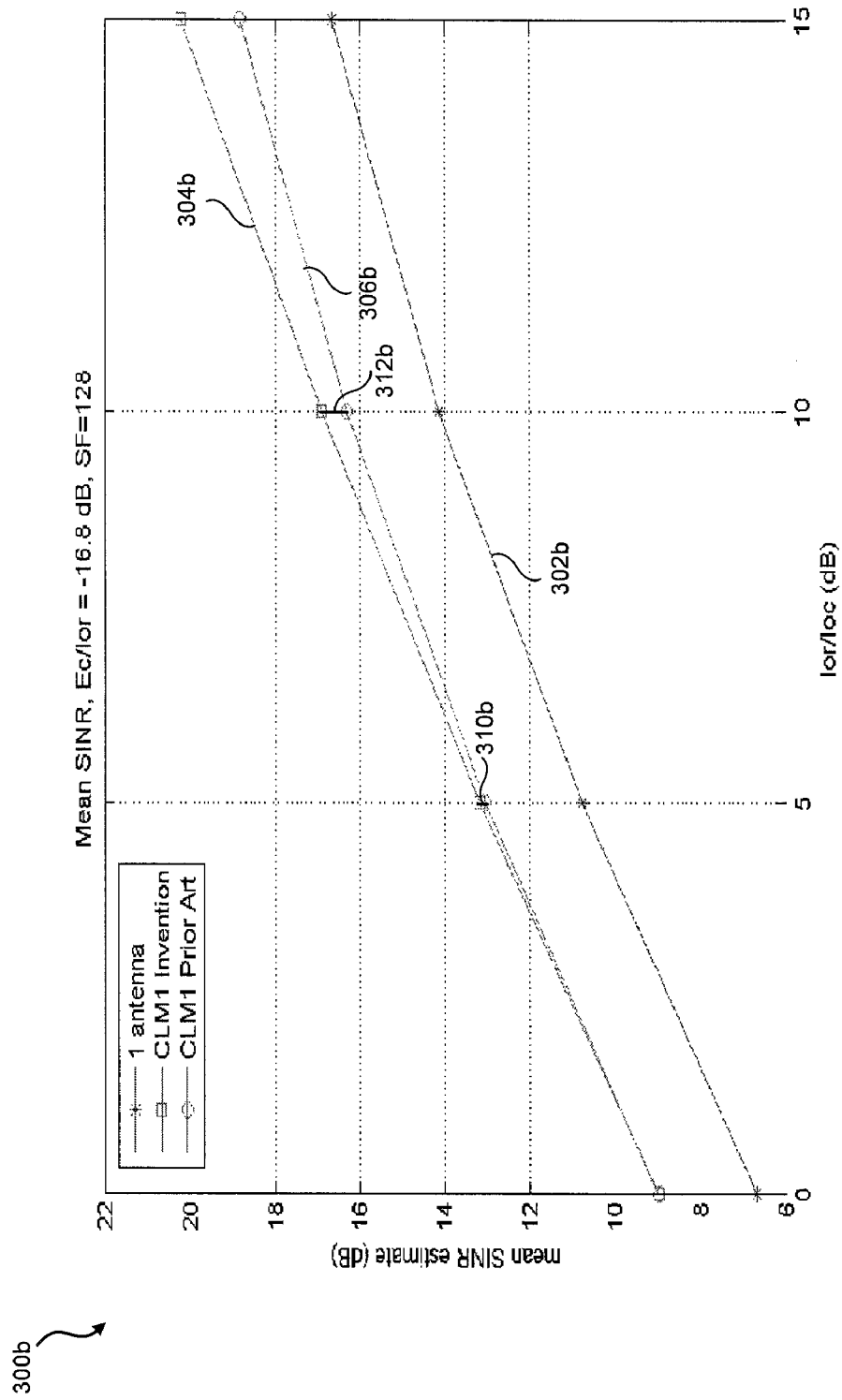
FIG. 3B is a second graph illustrating closed loop transmit diversity modes performance via interference suppression in a wireless system using a RAKE receiver, in accordance with an embodiment of the invention.

Referring to FIG. 3B, graphs 302a, 304a, and 306a illustrate closed loop transmit diversity modes performance when the channel response comprises 2 power taps of relative power [0, −10] dB. As illustrated in FIG. 3B, the gain of CLM1 using maximizing the SINR criterion, graph 304b, increases over CLM1 using the prior art technique of maximizing the receive power, as illustrated by increasing gaps 310b and 312b.

Figure 3C:
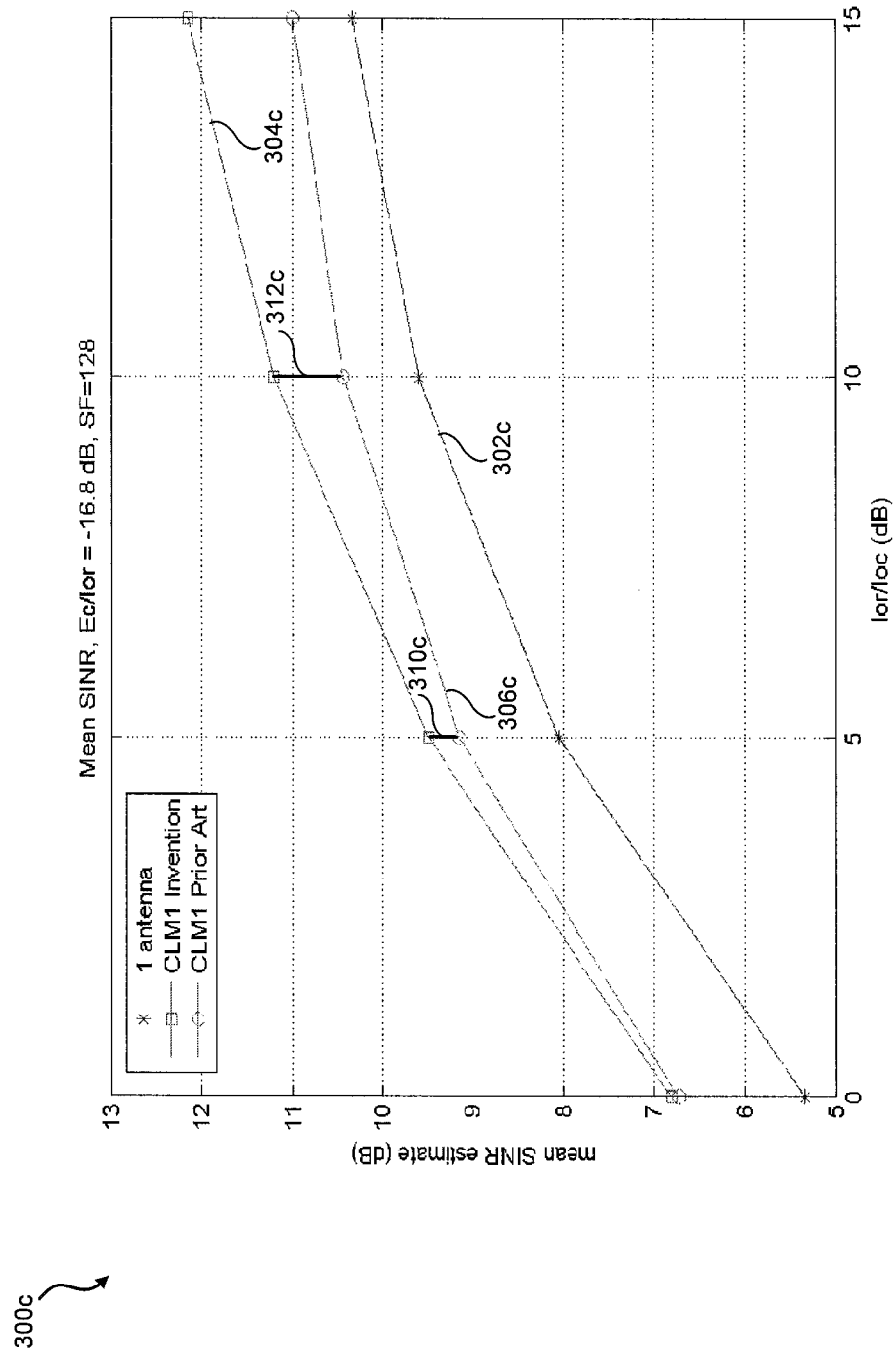
FIG. 3C is a third graph illustrating closed loop transmit diversity modes performance via interference suppression in a wireless system using a RAKE receiver, in accordance with an embodiment of the invention.

Referring to FIG. 3C, graphs 302a, 304a, and 306a illustrate closed loop transmit diversity modes performance when the channel response comprises 4 taps of relative power [0, −3, −6, −9] dB. As illustrated in FIG. 3C, the gain of CLM1 with prior art technique, graph 306a, over the 1-antenna system, graph 302a, diminishes with increasing system geometry. However, the gain of CLM1 using the maximized SINR criterion as illustrated in graph 304c, increases over CLM1 using the prior art technique of maximizing the receive power, as illustrated by increasing gaps 310c and 312c. The gain values 310c and 312c of CLM1 using the maximized SINR criterion over prior art under these channel conditions may be estimated as 0.33 dB and 0.75 dB, respectively, at system geometry values 5 and 10 dB, respectively.

Referring to FIG. 3D, graphs 302a, 304a, and 306a illustrate closed loop transmit diversity modes performance when the channel response comprises a single tap, in instances of flat fading. As illustrated in FIG. 3D, both CLM1 performances represented by graphs 304d and 306d overlap in this case because the criteria of both methods become equivalent in flat fading. The gain of CLM1 using maximizing the SINR criterion as illustrated in graph 304d, over the 1-antenna system, graph 302d, is 2.5 dB across the entire range of system geometry.

Figure 4:
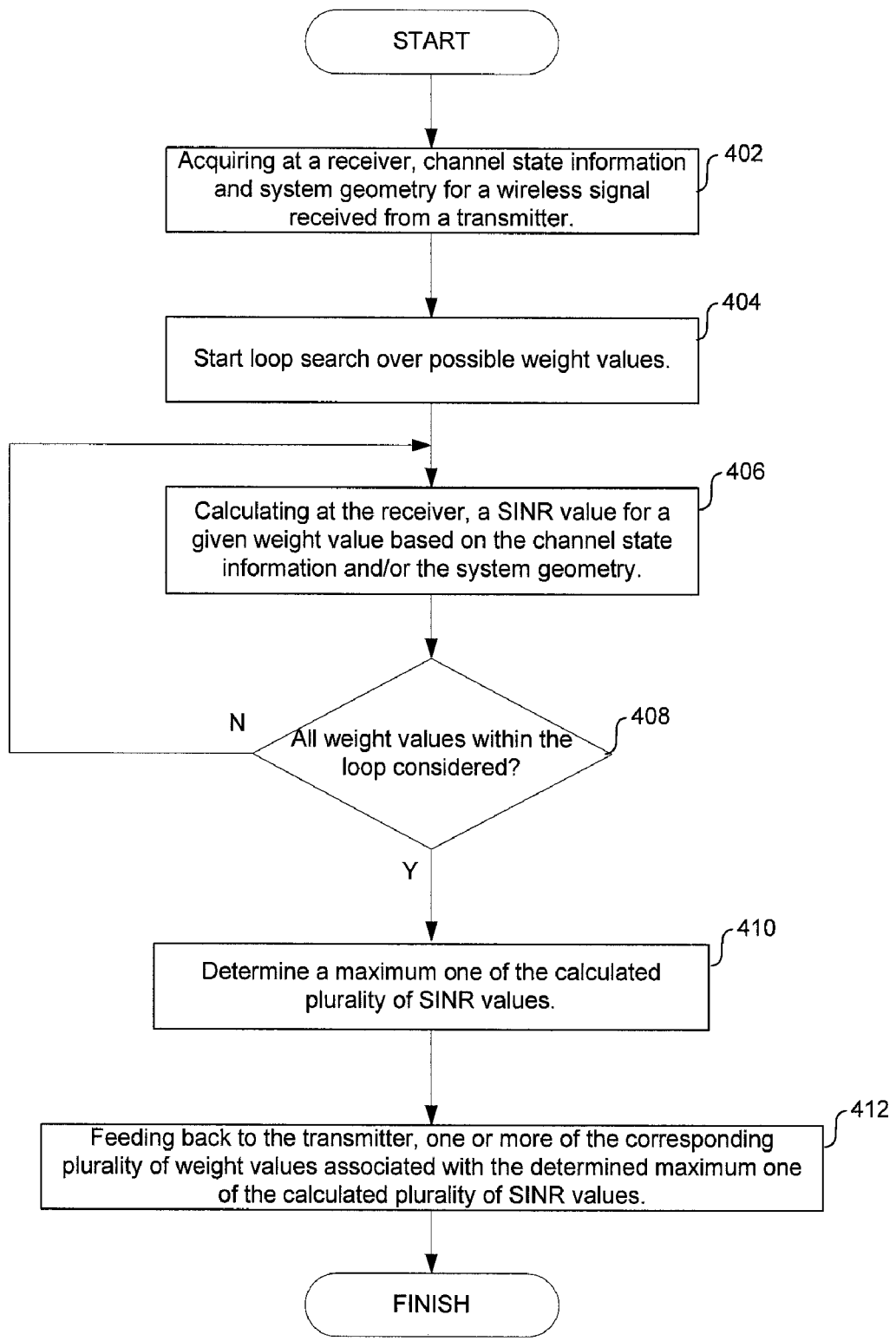
FIG. 4 is a flow diagram illustrating exemplary steps for processing wireless signals in a WCDMA network equipped with a RAKE receiver, in accordance with an embodiment of the invention.

FIG. 4 is a flow diagram illustrating exemplary steps for processing wireless signals in a WCDMA network equipped with a RAKE receiver, in accordance with an embodiment of the invention. Referring to FIGS. 2 and 4, at 402, channel state information and system geometry information may be acquired by the WVPB 221 for a wireless signal received via the antenna 206 from the transmit side 200a. At 404, the WVPB 221 may initiate a loop search over a plurality of weight values. At 406, the WVPB 221 may calculate a SINR value for a given weight value, based on the channel state information and/or the system geometry information. At 408, it may be determined whether all weight values within the loop are considered. If not all weight values within the loop are considered, processing may resume at step 406 for a subsequent weight value. If all weight values within the loop are considered, at 410, the WVPB 221 may determine a maximum one of the calculated plurality of SINR values. At 412, the WVPB 221 may feed back to the transmit side 200a via the link 201a, one or more of the corresponding plurality of weight values associated with the determined maximum one of the calculated plurality of SINR values.

In an embodiment of the invention, a machine-readable storage may be provided, having stored thereon, a computer program having at least one code section executable by a machine, thereby causing the machine to perform the steps described herein for processing signals in a wireless communication system so as to improve CL transmit diversity modes performance via interference suppression in a WCDMA network equipped with a RAKE receiver.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a wireless communication system, the method comprising:
   determining at a receiver, a maximum one of a plurality of signal-to-interference-plus-noise ratio (SINR) values for a received wireless signal, said plurality of SINR values calculated using a corresponding plurality of weight values; and
   feeding back to a transmitter of said received wireless signal, a particular one of said corresponding plurality of weight values, wherein said particular one of said corresponding plurality of weight values is associated with said determined maximum one of said calculated plurality of SINR values.

2. The method according to claim 1, comprising communicating said particular one of said corresponding plurality of weight values to said transmitter via at least one uplink communication channel.

3. The method according to claim 1, wherein each of said plurality of SINR values comprises at least one inter-path interference (IPI) value.

4. The method according to claim 1, wherein said plurality of weight values comprises at least one closed loop mode 1 (CLM1) weight value.

5. The method according to claim 1, wherein said plurality of weight values comprises at least one closed loop mode 2 (CLM2) weight value.

6. The method according to claim 1, comprising: calculating said plurality of SINR values for said wireless signal utilizing at least one phase shift value; and selecting said at least one phase shift value from a range of [0°; 360°] utilizing at least one quantized step value.

7. The method according to claim 1, comprising calculating said plurality of SINR values for said wireless signal utilizing one or both of a phase shift value and/or an amplitude value.

8. The method according to claim 1, comprising acquiring at said receiver, one or both of channel state information and/or system geometry information for said received wireless signal.

9. The method according to claim 8, comprising calculating at said receiver, said plurality of SINR values for said received wireless signal, based on one or both of said channel state information and/or said system geometry information.

10. A system for processing signals in a wireless communication system, the system comprising:
   one or more processors and/or circuits in a receiver, wherein said one or more processors and/or circuits are operable to:
      determine at said receiver, a maximum one of a plurality of signal-to-interference-plus-noise ratio (SINR) values for a received wireless signal, said plurality of SINR values calculated using a corresponding plurality of weight values; and
      feed back to a transmitter of said received wireless signal, a particular one of said corresponding plurality of weight values, wherein said particular one of said corresponding plurality of weight values is associated with said determined maximum one of said calculated plurality of SINR values.

11. The system according to claim 10, wherein said one or more processors and/or circuits are operable to communicate said particular one of said corresponding plurality of weight values to said transmitter via at least one uplink communication channel.

12. The system according to claim 11, wherein said at least one uplink communication channel comprises a high-speed dedicated physical control channel (HS-DPCCH).

13. The system according to claim 10, wherein each of said plurality of SINR values comprises at least one inter-path interference (IPI) value.

14. The system according to claim 10, wherein said plurality of weight values comprises at least one closed loop mode 1 (CLM1) weight value.

15. The system according to claim 10, wherein said plurality of weight values comprises at least one closed loop mode 2 (CLM2) weight value.

16. The system according to claim 10, wherein said one or more processors and/or circuits are operable to: calculate said plurality of SINR values for said wireless signal utilizing at least one phase shift value; and select said at least one phase shift value from a range of [0°; 360°] utilizing at least one quantized step value.

17. The system according to claim 10, wherein said one or more processors and/or circuits are operable to calculate said plurality of SINR values for said wireless signal utilizing one or both of a phase shift value and/or an amplitude value.

18. The system according to claim 10, wherein said one or more processors and/or circuits are operable to acquire at said receiver, one or both of channel state information and/or system geometry information for said received wireless signal.

19. The system according to claim 18, wherein said one or more processors and/or circuits are operable to calculate at said receiver, said plurality of SINR values for said received wireless signal, based on one or both of said channel state information and/or said system geometry information.

20. A receiver for processing signals in a wireless communication system, the receiver comprising:
   one or more processors and/or circuits operable to:
      calculate a plurality of signal-to-interference-plus-noise ratio (SINR) values for a received wireless signal based on a corresponding plurality of weight values and one or more of:
         channel state information,
         system geometry information,
         a phase shift value and/or
         an amplitude value;
      determine a maximum of the plurality of SINR values; and
      feed back the weight value in the corresponding plurality of weight values that is associated with the maximum of the plurality of SINR values.

* * * * *